(12) United States Patent
Schilling et al.

(10) Patent No.: US 11,612,944 B2
(45) Date of Patent: Mar. 28, 2023

(54) DEVICE AND METHOD FOR FORMING A SHINGLE STREAM OF UNDER- OR OVERLAPPING SHEETS

(71) Applicant: BW Papersystems Stuttgart GmbH, Nürtingen (DE)

(72) Inventors: Andreas Schilling, Lichtenstein (DE); Hansjörg Klein, Aichwald (DE)

(73) Assignee: BW Papersystems Stuttgart GmbH, Nürtingen (DE)

( * ) Notice: Subject to any disclaimer, the term of this patent is extended or adjusted under 35 U.S.C. 154(b) by 524 days.

(21) Appl. No.: 16/621,537

(22) PCT Filed: Jun. 14, 2018

(86) PCT No.: PCT/EP2018/065827
§ 371 (c)(1),
(2) Date: Dec. 11, 2019

(87) PCT Pub. No.: WO2018/229201
PCT Pub. Date: Dec. 20, 2018

(65) Prior Publication Data
US 2021/0146457 A1 May 20, 2021

(30) Foreign Application Priority Data

Jun. 14, 2017 (DE) .......................... 102017005661.7
May 9, 2018 (DE) ........................... 102018111190.8

(51) Int. Cl.
*B65H 5/24* (2006.01)
*B65H 29/68* (2006.01)
(Continued)

(52) U.S. Cl.
CPC .............. *B23D 15/08* (2013.01); *B65H 5/24* (2013.01); *B65H 29/242* (2013.01);
(Continued)

(58) Field of Classification Search
CPC ........ B65H 5/24; B65H 29/68; B65H 29/686; B65H 29/6654; B65H 29/242;
(Continued)

(56) References Cited

U.S. PATENT DOCUMENTS 3,730,515 A    5/1973 Spiess
4,136,865 A *  1/1979 Marass .............. B65H 29/6636
                                                      271/182

(Continued)

FOREIGN PATENT DOCUMENTS

DE          3812685 A1    10/1989
DE         10103040 A1    11/2001
(Continued)

OTHER PUBLICATIONS

International Search Report issued in corresponding International Application No. PCT/EP2018/065827, dated Oct. 1, 2018.

*Primary Examiner* — Luis A Gonzalez
(74) *Attorney, Agent, or Firm* — Andrus Intellectual Property Law, LLP

(57) ABSTRACT

The invention relates to a device, in particular a roll cross-cutter, for forming a shingle stream of underlapping or overlapping sheets, in particular of paper or carton sheets, having a transport apparatus for transporting sheets, having a shingling apparatus for underlapping or overlapping sheets in regions, having a deceleration apparatus, downstream of the shingling apparatus in the transport direction of the sheets, for decelerating shingled sheets, in particular by forming a deceleration gap for the passage of shingled, combined sheets, and, preferably, having a cross-cutting apparatus upstream of the shingling apparatus for cutting a material web into individual sheets. According to the inven- (Continued)

tion, the shingling apparatus is designed to be adjustable, in dependence of the cut length, in and/or opposite the transport direction of the sheets.

12 Claims, 3 Drawing Sheets

(51) Int. Cl.
*B23D 15/08* (2006.01)
*B65H 29/24* (2006.01)
*B65H 29/66* (2006.01)

(52) U.S. Cl.
CPC ......... *B65H 29/6636* (2013.01); *B65H 29/68* (2013.01); *B65H 2406/323* (2013.01); *B65H 2511/11* (2013.01)

(58) Field of Classification Search
CPC ............ B65H 29/6618; B65H 29/6636; B65H 2511/11; B65H 2406/323; B65H 2301/44732; B23D 15/08
See application file for complete search history.

(56) References Cited

U.S. PATENT DOCUMENTS

| | | |
|---|---|---|
| 5,275,394 A | 1/1994 | Mank et al. |
| 5,950,510 A | 9/1999 | Scheffer et al. |
| 2010/0044946 A1 | 2/2010 | Ootaki |
| 2016/0023859 A1 | 1/2016 | Klein |

FOREIGN PATENT DOCUMENTS

| | | |
|---|---|---|
| DE | 10119408 A1 | 11/2001 |
| EP | 1976789 A1 | 10/2008 |
| JP | S4832029 B1 | 10/1973 |
| JP | H0578000 A | 3/1993 |
| JP | 2000296960 A | 10/2000 |
| JP | 2015524781 A | 8/2015 |

\* cited by examiner

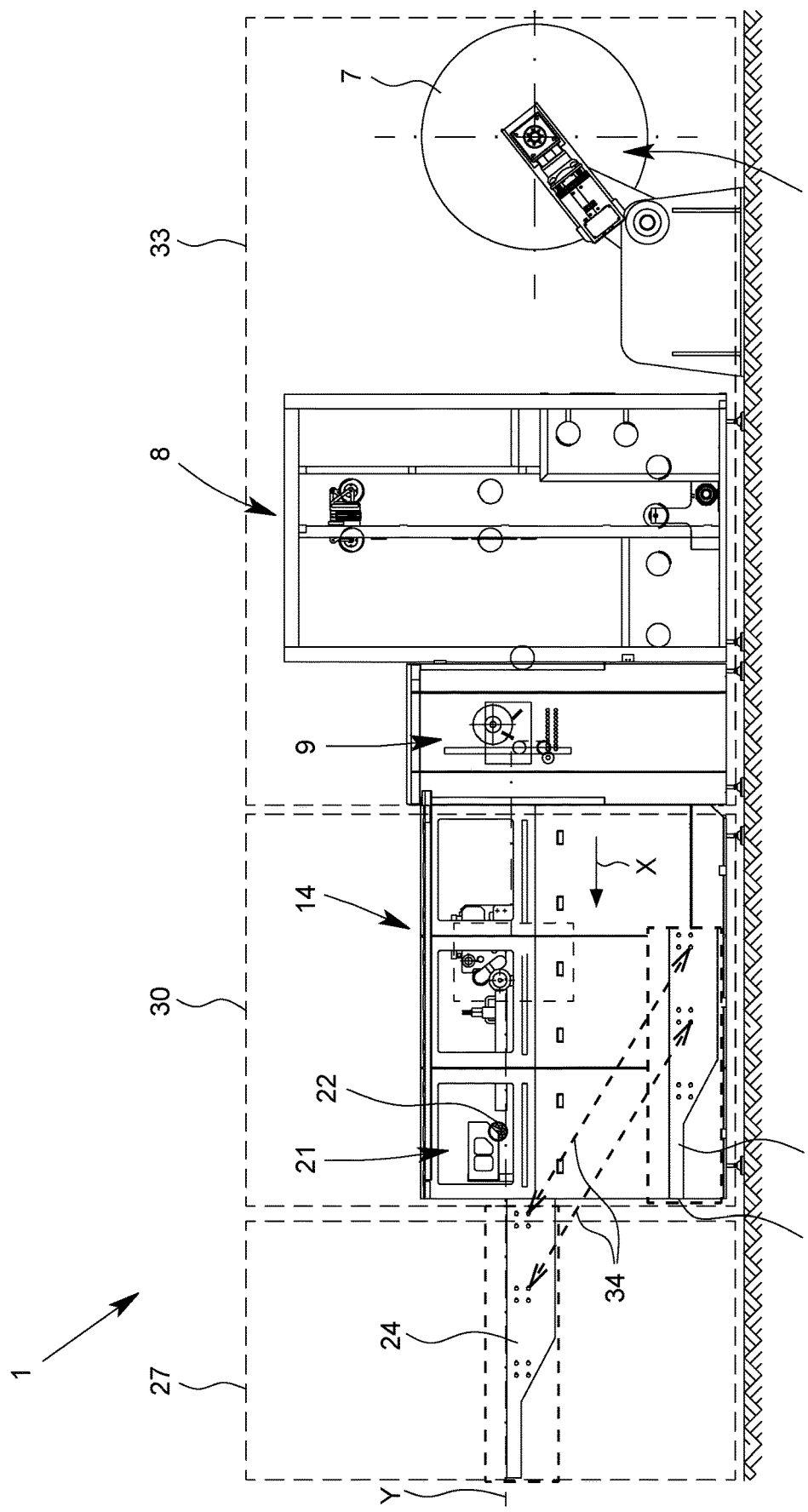

DEVICE AND METHOD FOR FORMING A SHINGLE STREAM OF UNDER- OR OVERLAPPING SHEETS

CROSS-REFERENCE TO RELATED APPLICATIONS

This application is the U.S. national stage application of International Application PCT/EP2018/065827, filed Jun. 14, 2018, which International Application was published on Dec. 20, 2018, as International Publication WO 2018/229201 in the German language. The International Application claims priority to German Application No. 102017005661.7, filed Jun. 14, 2017, and German Application No. 102018111190.8, filed May 9, 2018. The International Application and German Applications are all incorporated herein by reference, in their entireties.

FIELD

The invention relates to a device, in particular a so-called roll-type cross-cutter, for forming a shingled stream of underlapping or overlapping sheets, in particular paper or cardboard sheets, having a transport apparatus for transporting sheets, having a shingling apparatus for underlapping or overlapping the sheets in regions, having a braking apparatus which is situated downstream of the shingling apparatus in a transport direction of the sheets and which serves for braking shingled sheets, in particular by forming a braking gap for the passage of sheets that have been brought together in shingled form, and, preferably, having a cross-cutting apparatus which is positioned upstream of the shingling apparatus in the transport direction and which serves for cutting a material strip into individual sheets. The invention furthermore relates to a method for forming a shingled stream of underlapping or overlapping sheets, in particular foils or paper or cardboard sheets, furthermore in particular for forming a shingled stream of individual sheets cut from a material strip by means of a cross-cutter, wherein separated sheets are transported to a shingling apparatus and are underlapped or overlapped in regions in order to generate a shingled stream, and wherein the shingled sheets are braked by means of a braking apparatus which is situated downstream of the shingling apparatus in a transport direction of the sheets.

BACKGROUND

A roll-type cross-cutter is known for example from DE 101 03 040 A1. With the known roll-type cross-cutter, paper or cardboard sheets can be provided as a virtually endless strip in the form of a paper roll. By means of a feed apparatus with rolls or drums, the strip is fed to a cross-cutting apparatus and, there, is cut into sheets with a defined length. Commonly, a paper store is positioned upstream of the feed apparatus in order to maintain a reserve of a particular web length of the paper. The cut sheets are fed with the aid of fast-running transport belts to a shingling apparatus for forming an underlapping of the sheets. The shingling apparatus comprises a raising shaft and, arranged above the latter, a suction belt. The sheets running through the shingling apparatus are, at a defined point of the sheets, in particular in relation to the rear edge of the sheets, raised relative to the transport plane by the raising shaft and pressed against the suction belt arranged thereabove. The suction belt revolves at a lower speed than the fast-running transport belts that transport the sheets onward from the cross-cutting apparatus. In this way, the sheet is braked. The shingling apparatus acts here as a first, rear braking unit. The following sheet is thus moving at a higher speed than the upturned leading sheet. The speed difference gives rise to an underlapping of the sheets. In this way, a continuous shingled stream is generated. With the next cycle of the shingling apparatus, the trailing sheet is engaged by the beater shaft, pressed against the suction belt, and braked. Each sheet remains engaged by the suction belt for longer than one cycle.

A braking apparatus as second, front braking unit is positioned downstream of the shingling apparatus in the transport direction of the shingled stream. A braking apparatus of this type is described for example in DE 38 12 685 A1. The braking apparatus may have at least one so-called nip roll which, together with a transport belt, a further roll or drum, forms a braking gap. The spacing between the braking apparatus and the shingling apparatus is set such that the sheet front edge of a sheet preferably runs into the braking gap, and is decelerated, just as the rear sheet region, in particular the rear edge of the sheet, is pressed by the raising shaft of the shingling apparatus against the suction belt. In this way, the sheet is preferably approximately simultaneously braked or decelerated by the nip roll in the front sheet region and by the suction belt of the shingling apparatus in the rear sheet region. In this way, the formation of a wave in the sheet during the braking process is prevented. Following the braking apparatus, the underlapping sheet stream formed by the underlapping sheets is transported onward, with the same speed and the same shingling length of the underlapping sheets, onto a transfer table with slow-running transport belts to a further-processing machine.

As described in the preceding paragraph, the sheets are braked approximately simultaneously at their front and rear edges. A sagging leading sheet can impede the following sheet in its forward movement during the underlapping process, which can lead to problems in terms of positioning accuracy. After being pushed up against the suction belt by the beater shaft, the sheets are tensioned between the suction belt and the braking apparatus in order to prevent sagging of the sheets. The tensioning of the sheets is realized by virtue of the speed of the suction belt being set to be somewhat lower than the speed of the nip rolls of the braking apparatus. Owing to the tensile forces that are exerted on the sheet by the speed difference between the nip rolls and the suction belt, the sheet is tensioned, and the sagging is reduced. When the leading sheet moves out of the engagement region of the suction belt, said sheet is no longer held by the suction belt. The leading sheet is then held only by the trailing sheet, which is (still) situated in the engagement region of the suction belt. Since, with increasing sheet length, the weight of the leading sheet, which must be borne by the trailing sheet, increases, the risk of sagging of the sheets increases in the case of large sheet formats.

In the transport direction of the shingled stream, a transfer point is provided at which the individual sheets are subsequently gripped or taken hold of by a receiving device of the further-processing machine or by the further-processing machine itself and thus transferred to the further-processing machine. The transfer point is generally situated, in the sheet transport direction, downstream of the end of the transfer table. For disruption-free further processing, the individual sheets must be provided at the transfer point at a particular point in time, that is to say the sheets must, with regard to the front edge, reach the transfer point at a particular point in time and with the cycle frequency of the receiving device of the further-processing machine. The phase position and cycle frequency of the further-processing machine thus determine the cycle frequency and the phase position of the device as a whole. Here, a cycle refers to the time period between the gripping of the front edge of a first sheet and the gripping of the front edge of a second sheet by the further-processing machine. Thus, both the shingling apparatus and the cross-cutting apparatus must operate with the same cycle as the further-processing machine. The phase position describes for example the relative position of a blade of the cross-cutting apparatus, of a raising shaft of the shingling apparatus and of a receiving device of the further-processing machine. The phase position remains the same during operation, but changes in the event of a change in the sheet format. The cycle frequency of the further-processing machine is normally the same for all sheet formats.

The sheets are received by the further-processing machine at a defined speed from the roll-type cross-cutter and are conveyed onward at said speed. Since the sheets may be subjected only to a certain degree of acceleration, the sheets must, as far as possible, be provided at the transfer point at the same speed as the further-processing machine. The sheets must therefore be provided at the transfer point not only at a particular point in time but also with a defined speed.

The braking apparatus of the roll-type cross-cutter is adjustable in a manner dependent on a cut length. If the sheet format, that is to say the length of the sheet, is changed, the spacing between the braking apparatus and the shingling apparatus must be correspondingly adapted by virtue of the braking apparatus being adjusted in or counter to the transport direction of the sheets. For this purpose, the nip roll is adjusted in the transport direction of the sheets relative to the shingling apparatus preferably such that the front edge of a sheet runs into the braking gap, and is decelerated, just as the rear sheet region is pressed by the raising shaft against the suction belt. By means of the adjustment of the braking apparatus, it is thus ensured that the sheets are preferably braked or decelerated substantially simultaneously at the front and rear edge region of the respective sheet.

The cycle frequency and the phase positions of sheet transport, shingling and cutting of the paper web, that is to say the periodic arrival of the front edge of a sheet of the shingled stream at the transfer point to the further-processing machine, the periodic upturning of the rear edge of a leading sheet in the shingling apparatus and the periodic cutting of the strip into sheets by means of the cross-cutting apparatus, must be coordinated with the phase position and cycle frequency of the further-processing machine. To ensure the disruption-free transfer of the sheets to the further-processing machine, the sheets must arrive at the transfer point at a particular point in time and with a required speed profile, that is to say with a particular cycle frequency. If the sheets are provided at the transfer point with an invariant cycle frequency and an invariant transport speed, all sheet front edges arriving at the transfer point have the same spacing to the respectively trailing sheet front edge. This means that the sheets are provided with a constant overlap length at the transfer point. The overlap length should preferably be adapted such that the spacing between the nip roll and the transfer point is an integer multiple of the overlap length in order that, in each case, a sheet is provided at the transfer point when, at the same time, a following sheet is braked with its front edge by the braking apparatus and held with its upturned rear edge against the suction belt of the shingling apparatus.

When a sheet has just been turned up at its rear edge and braked, the trailing sheet can be conveyed under the leading sheet. This point in time constitutes an optimum stopping point of the apparatus, because the trailing, fast sheet can be conveyed under the slow leading sheet. It is thus possible for the fast-running transport belts to be braked more slowly than the slow-running belts, because the sheet length can be utilized as an additional braking travel of the trailing sheet. By contrast, braking the fast-running belts at exactly the same rate as the slow-running belts is complex and involves a high level of wear. Furthermore, in the case of intense braking, the sheets can slip on the fast-running belts, which must imperatively be prevented, because the sheets are otherwise no longer situated in the correct phase position, that is to say the sheets are no longer situated at the intended location in the device at the correct point in time.

If, in the event of a format change, the braking apparatus is adjusted relative to the shingling apparatus, this inevitably also leads to a variation of the spacing between the braking apparatus and the transfer point to the further-processing machine, or to a variation of the transfer length. In order to ensure the disruption-free stoppage of the device, it is therefore necessary in the event of a format change, and thus a variation of the transfer length, to vary the overlap length of the sheets in the shingled stream in order to satisfy the requirement for the transfer length to correspond to an integer multiple of the overlap length. Here, the overlap length is determined by the difference between the fast-running and slow-running transport belts.

In the event of a format change, it is thus necessary for the speeds of the fast-running and slow-running belts to be adapted such that the transfer length corresponds to an integer multiple of the overlap length. Since the sheets are gripped and conveyed at a defined speed by the further-processing machine, the speed at which the sheets are delivered at the transfer point must not deviate from the speed of the further-processing machine to too great an extent, in order that damage to or slippage of the sheets owing to excessive accelerations is prevented. The speed of the slow-running belts can thus be adapted only in a limited scope.

The setting of a suitable overlap length is very complex, because it is not only necessary to take into consideration the above-described spacing between the nip roll and the transfer point and also the speed deviation of the slow-running belts from the conveying speed of the further-processing machine. It is additionally necessary to prevent the device from being stopped when the blades of the cross-cutting apparatus are presently engaged and are thus situated in the cutting position. A situation may arise in which, in the case of a changed sheet format, the blades of the cross-cutting apparatus are presently situated in the cutting position when the further-processing machine is stopped. The sheet presently being cut, as well as the material web, may be damaged as a result, whereby the entire process can be disrupted, or a complex manual removal of the damaged sheet and/or of the web region is necessary. A stoppage of the further-processing machine while the blades of the cross-cutting apparatus are presently situated in the cutting position must therefore be prevented under all circumstances. For each sheet format, a configuration must be found with which a situation does not arise in which the blades of the cross-cutting apparatus are situated in the cutting position in the event of a stoppage of the further-processing machine.

In such a case, it is for example possible for the speed of the fast-running belts to be varied. A variation of the speed of the fast-running belts is coupled to a displacement of the phase position of the blades of the cross-cutting apparatus. At the same time, the speed of the slow-running belts must also be changed in order that the transfer length corresponds to an integer multiple of the overlap length. This has the effect that the sheets are delivered at the transfer point with a speed which deviates from the speed of the further-processing machine. The provision of the sheets with a non-optimal speed at the transfer point has the effect that the sheets must be accelerated or decelerated during the transfer to the further-processing machine. If the deviation of the speed of the slow-running belts is too great, a disruption-free transfer of the sheets to the further-processing machine can no longer take place. In such a case, the overlap length must be changed in order that the slow-running belts are operated at a speed which permits a disruption-free transfer of the sheets to the further-processing machine.

In the event of a format change or the setting of the device to a particular format, it is thus necessary to consider a multiplicity of boundary conditions. As a primary condition, it is necessary to prevent a stoppage of the device from occurring when the blades of the cross-cutting apparatus are presently engaged. At the same time, the speed of the slow-running belts must be set such that a disruption-free transfer of the sheets to the further-processing machine is ensured. Additionally, the transfer length should, as far as possible, correspond to an integer multiple of the overlap length. The stated conditions are ultimately influenced by the selected speeds of the fast-running and slow-running belts and the spacing between the braking apparatus and the shingling apparatus. Owing to the multiplicity of conditions, it is not possible for all conditions to be satisfied for each sheet format. For each sheet format, it is thus only possible to find a compromise between the overlap length and the speeds of the fast-running and slow-running belts, in the case of which the boundary conditions of prevention of a stoppage of the blades of the cross-cutting apparatus when in engagement and disruption-free transfer of the sheets to the further-processing machine can still be satisfied.

The operation of the device under non-optimal conditions, that is to say the transfer length does not correspond to an integer multiple of the overlap length and/or the speed of the slow-running transport belts is not optimally adapted to the further-processing machine, has the effect that, in a manner dependent on the sheet format, the front edges of the sheets are situated in each case in a different position in the event of a stoppage of the machine. Only the first, leading sheet always comes to a standstill with its front edge in the same defined position at the transfer point in the event of a stoppage of the device irrespective of format. The fast-running and slow-running belts must come to a standstill simultaneously in the event of a stoppage of the device, because otherwise the phase position of the sheets relative to one another could be changed, in particular between the sheets that are in engagement with the slow-running belts and the sheets that are in engagement with the fast-running belts.

Rapid braking of the slow-running belts generally does not constitute a problem. Rapid braking of the fast-running belts however leads to high material loading and is technically complex. The rapid braking leads not only to increased wear of the fast-running belts and of the braking apparatuses thereof but also to increased energy consumption. In order to be able to stop the fast-running belts and sheets quickly, a considerably greater amount of energy is required in the case of the braking of the slow-running belts. In the event of an abrupt stoppage of the fast-running belts, there is the risk of the sheets slipping onward owing to inertia. Since a sheet that has slipped is no longer in the correct phase position in the device in relation to the functional units of the device, in particular the braking apparatus and shingling apparatus, a slippage of the sheets must be prevented. The braking of the sheets is therefore generally assisted by switchable additional braking units, for example by blown air and/or suction air. The further braking units additionally increase the energy requirement during the braking of the fast-running belts.

SUMMARY

It is an object of the present invention to provide a device and a method of the respective type mentioned in the introduction which permit a change in the sheet format with little complexity and a system stoppage which is straight-forward in terms of a method, wherein it is sought in particular to avoid adverse operating states in the event of a system stoppage, such as the stoppage of the cross-cutting apparatus in the cutting position. Furthermore, it is the intention for the device and the method to permit a material-preserving and energy-saving system stoppage.

The above-stated object is achieved according to the invention, in the case of a device of the type mentioned in the introduction, in that the shingling apparatus is designed to be adjustable in and/or counter to the transport direction of the sheets in a manner dependent on a cut length. "In a manner dependent on a cut length" relates to a change in the arrangement of the shingling apparatus relative to the cross-cutter, and preferably relative to the braking apparatus, for a format change of the sheet format. Accordingly, in the method according to the invention, provision is made whereby the shingling apparatus is adjusted in or counter to the transport direction of the sheets in the event of a change in the cut length of the sheets or in the event of a change in the sheet format.

The invention is based on the underlying concept of moving, relocating or displacing the shingling apparatus in or counter to the transport direction of the sheets, in a manner dependent on the present (new) sheet length and in particular relative to the braking apparatus that is situated immediately downstream of the shingling apparatus, such that, in the case of every settable sheet length, a leading sheet is braked approximately simultaneously at the front by the braking apparatus and at the rear by the shingling apparatus. In particular, the invention thus makes it possible for the spacing between the transfer point and the braking apparatus, or the transfer length, to be kept constant in the event of a format change, wherein the braking apparatus is preferably not adjusted in the event of a format change. Instead, the spacing between the preferably positionally fixedly arranged braking apparatus and the shingling apparatus is adapted to the actual cut length, that is to say changed beyond the extent of a fine adjustment, by adjustment of the shingling apparatus.

Thus, the spacing between the front transfer point of the separated sheets to a sheet processing machine and the braking device, or the transfer length, can remain the same for different formats or cut lengths, which leads to a considerable simplification in the setting of the device according to the invention to a different sheet format. In particular, with an invariant transfer length, the need for varying the overlap length of the sheets in the shingled stream in the event of a format change is eliminated. Since the overlap length remains invariant for all sheet formats, the speed of the slow-running transport belts can be kept the same for all sheet formats. It is thus only necessary to adapt the speed of the fast-running transport belts and the phase position of the blades of the cross-cutter apparatus and of the raising means of the shingling apparatus to the new sheet format. The speed of the slow-running belts thus always corresponds to the speed with which the sheets are received and transported onward by the further-processing machine.

In the case of an unchanged spacing between the front transfer point and the braking apparatus, that is to say the nip rolls, and in the case of an unchanged overlap length of the sheets in the shingled stream, wherein the transfer length corresponds to an integer multiple of the overlap length, it is ensured, in the event of a system stoppage when the front edge of a leading sheet is situated at the transfer point, that the front edge of a trailing sheet is just braked by the braking apparatus and the rear edge of said sheet is moved, that is to say raised or lowered, out of the sheet stream by the shingling apparatus. This makes it possible for the fast-running belts to be braked differently than the slow-running belts, because it is ensured at all times that a further trailing sheet can be transported with its front edge under or over the leading sheet in the transport direction that has been moved, that is to say raised or lowered, out of the sheet stream by the shingling apparatus. The sheet length or the spacing between the shingling apparatus and the braking apparatus serves here as a buffer for the trailing sheet. Irrespective of the sheet format, it is thus ensured that the trailing sheet can be conveyed under or over the leading sheet.

In the event of a stoppage of the further-processing machine, an identical, defined stoppage position is thus provided for each sheet format. This means that the sheet front edges of the sheets that are situated between the transfer point and the braking apparatus are, for each sheet format, situated in the same positions in the event of a stoppage. At the same time, the same number of shingles, that is to say the same number of sheets, is situated between the transfer point and the braking apparatus in the event of a system stoppage. The fast-running belts can, owing to the buffer between the leading, upturned sheet and the trailing sheet, be stopped in a decelerated manner in relation to the slow-running belts, such that a stoppage while the blades of the cross-cutting apparatus are situated in the cutting position can be prevented in an effective manner for every sheet format. The device is thus capable of stopping the fast-running belts in a manner dependent on the position of the blades of the cross-cutting apparatus such that the blades of the cross-cutting apparatus are not presently situated in the cutting position. This is made possible by virtue of the fast-running belts and the cross-cutting apparatus being stopped with a short time delay in relation to the slow-running belts.

The device is thus capable of braking the fast-running and slow-running belts in the event of a system stoppage such that the belts, or the sheets transported by the belts, are no longer situated in a matching phase position. In the event of a restart of the device, the slow-running belts can be started a short time before the fast-running belts, whereby the correct phase position in the device is restored. A system stoppage and a subsequent system start are thus possible easily and in a short time.

The material loading of the fast-running belts and of the braking units thereof can be reduced by means of braking of the fast-running and slow-running belts with different intensity. At the same time, the energy requirement during the braking of the fast-running belts is reduced. Since the risk of uncontrolled slippage of a sheet is minimized by means of the reduced braking, the braking of the sheets requires a lesser degree of assistance, or even no longer requires any assistance at all, from additional braking units. In this way, the energy requirement in the event of a system stoppage can be further reduced.

The shingling apparatus of the device according to the invention may preferably be designed for underlapping the sheets passing from the cross-cutting apparatus. The underlapping shingled stream can then be processed further in a printing machine, for example. Shingling apparatuses for generating an underlapping shingled stream are basically known to a person skilled in the art, for example from DE 101 03 040 A1 or DE 101 19 408 A1. It is however basically also possible for the shingling apparatus to be designed for overlapping the sheets of the sheet stream passing from the cross-cutting apparatus. A shingling apparatus for generating an overlapping shingled stream is described for example in EP 1 976 789 B1. The overlapping shingled stream can be processed further in a stacking apparatus. Both in the case of overlapping and in the case of underlapping, the expression "overlap length" is used, which denotes the spacing from the front edge of the leading shingled sheet to the front edge of the immediately trailing shingled sheet.

The shingling apparatus may have a decelerating unit for braking the sheets and a raising unit for underlapping the sheets, or may have a decelerating unit and a pushing-down unit for overlapping the sheets. By means of a raising unit, a leading sheet in the sheet stream can be pushed, preferably in the region of the rear edge, against a decelerating unit arranged above the raising unit. The decelerating unit and the raising unit may be formed as separate assemblies which functionally interact. The raising unit may for example have a beater shaft which guides an eccentric beater which, by means of the rotation of the beater shaft, raises the sheet in particular in the region of the rear edge and presses said sheet against the decelerating unit arranged above the beater shaft. The decelerating unit, formed for example by a transport belt which is provided with holes and which, together with a suction box, forms a suction belt, decelerates the movement of the pushed-up sheet. Since the transport belt is moving at a lower transport speed than the fast-running transport belt by means of which the sheets are transported from the cross-cutting apparatus to the shingling apparatus and onward, the sheets are braked by the decelerating unit and conveyed onward in the transport direction at a lower speed than the trailing sheet. The trailing sheet, which is still lying on the fast-running transport belt, is moving at a higher speed, and is thus conveyed under or over the leading sheet. In this way, an underlap or overlap, with regard to the rear edge of the sheets, of a continuous shingled stream is generated. With the next cycle of the shingling apparatus, the trailing sheet is taken hold of by the beater shaft, pressed against the suction belt, and braked. Each sheet remains in engagement with the suction belt for longer than one cycle. When, in the case of underlapping, the leading sheet departs from the region of influence of the suction belt, the leading sheet continues to be held up by the trailing sheet that is situated in the region of engagement of the suction belt. To assist the raising of the leading sheet, additional suction elements may be arranged between the suction belt and the braking apparatus, which additional suction elements generate a negative pressure and thus assist the lifting force of the suction belt. Alternatively or in addition, between the suction belt and the braking apparatus, there may also be arranged blowing elements which assist the raising of the leading sheet by means of a positive pressure.

Other structural solutions for generating an underlapping or overlapping shingled stream are however likewise possible. Accordingly, the raising of the sheets may also be performed by means of compressed air or by means of negative-pressure generation. For this purpose, the shingling apparatus may also have a pressure box or suction box which is controlled in a cyclic manner, that is to say compressed air is periodically discharged or a negative pressure is periodically generated, in order to raise the sheet or engage the sheet by suction. The raising of the sheets and the subsequent deceleration may also be performed by means of an identical assembly, for example a suction box, which engages the sheet by suction, preferably in the region of the rear edge, and then transports said sheet onward in a decelerated manner. Correspondingly adapted structural embodiments are possible in order to generate an underlap or overlap of the sheets.

A virtually endless strip of paper or cardboard can be fed to the device according to the invention. The strip may for example be unrolled from a roll and conducted through a paper store. In a cross-cutting apparatus, the strip can be cut into sheets with a defined format, that is to say a defined length. The cross-cutter may be a shaft which is equipped with one or more blades. In interaction with at least one further blade, which is situated below the strip or sheet transport plane and which is preferably static, the strip is cut into sheets. Alternatively, the cross-cutter may be two oppositely rotating shafts which are each equipped with one or more blades.

A braking apparatus is situated downstream of the shingling apparatus in the transport direction of the sheets. The braking apparatus may have one or more nip rolls which, for example together with slow-running transport belts, form a braking gap for the passage of sheets that have been brought together in shingled form. The braking apparatus brakes the incoming sheets at the sheet front edge and ensures that the underlapping or overlapping sheets are conveyed onward at an identical and constant speed in the transport direction. During operation, it is preferably simultaneously the case that a sheet, by way of its front edge, enters the braking gap of the braking apparatus while substantially simultaneously being braked by the suction belt of the shingling apparatus at the rear edge. The braking apparatus moves at a somewhat higher speed than the suction belt of the shingling apparatus during operation in order that the sheets are tensioned and sag to a lesser extent. The speed of the suction belt amounts to approximately 95-99% of the braking apparatus speed, preferably 97%.

The sheets are transported at a high speed by means of fast-running transport belts until the sheet front edge enters the braking gap of the braking apparatus and the sheets are simultaneously braked at the rear edge by the suction belt of the shingling apparatus. The sheets are subsequently transported onward at a constant, relatively low speed by means of slow-running belts.

A transfer table may be positioned downstream of the braking apparatus in the transport direction, on which transport table the overlapping sheets are transported onward in the transport direction and from which the individual sheets are transferred to a downstream further-processing machine. The transfer takes place at a transfer point which is dependent on the further-processing machine. The transfer point, at which the individual sheets must be delivered at a particular time and at a particular speed and with a particular cycle frequency in order to be received by the further-processing machine, is generally situated a short distance downstream of the transfer table in the sheet-conveying direction.

The shingling apparatus is, according to the invention, designed so as to be adjustable in and/or counter to the transport direction of the sheets in a manner dependent on a cut length. "In a manner dependent on a cut length" relates to a change in the spacing of the shingling apparatus relative to the positionally fixed cross-cutting apparatus for a format change of the sheet format.

In a preferred embodiment of the invention, the braking apparatus is designed to be non-adjustable in and/or counter to the transport direction of the sheets in a manner dependent on a cut length. In other words, this means that the braking apparatus is arranged so as to be positionally fixed and is not moved, relocated or displaced relative to the transfer point in the event of a format change of the sheet format.

The braking apparatus then always has the same spacing to the transfer point irrespective of the sheet format. Thus, no adjustment of the braking apparatus in a manner dependent on a cut length occurs. Owing to the constant transfer length, the system adaptation to a changed sheet format is considerably simplified. In the context of the invention it is however basically also not ruled out that the braking apparatus is, in addition to the shingling apparatus, designed to be adjustable in and/or counter to the transport direction of the sheets in a manner dependent on a cut length, which permits a very exact alignment of the two functional units with the front and rear edges of a trailing sheet.

In a further preferred embodiment of the invention, the spacing between the braking apparatus and the cross-cutting apparatus in the transport plane of the sheets is identical in the case of different cut lengths of the sheets or in the case of different sheet formats. In the event of a format change, there is thus no need for said spacing to be adapted, which further simplifies the format change.

The shingling apparatus may have a decelerating unit and a raising unit for underlapping the sheets, or a decelerating unit and a pushing-down unit for overlapping the sheets, wherein, preferably, the decelerating unit and the raising unit or pushing-down unit are jointly adjustable in or counter to the transport direction of the sheets. In this way, short setup times in the setting of the device according to the invention to a changed cut length of the sheets are made possible. The decelerating unit and the raising unit or the pushing-down unit may each have a dedicated drive for the adjustment in and/or counter to the transport direction of the sheets, and may preferably be activatable jointly or separately from one another. If the decelerating unit, designed for example as a suction belt, has a sufficient length in and/or counter to the transport direction, it is thus also possible for only the raising unit or the pushing-down unit to be adjusted in and/or counter to the transport direction of the sheets.

A known roll-type cross-cutter of the type described in DE 101 19 408 A1 is of a modular nature, wherein the cross-cutting apparatus and the shingling apparatus are arranged in a common chassis. The chassis can, by means of rollers which are mounted on rails, be moved or displaced laterally or transversely with respect to the transport direction of the sheets relative to a feeder of a further-processing machine. By means of the lateral mobility of the chassis, it is sought to realize easy access for maintenance and servicing work, wherein the chassis makes it possible for the cross-cutting apparatus to be moved entirely out of the region of the feeder of the further-processing machine.

Access to the functional units mounted in the chassis is however complex and time-consuming. In the case of the shingling apparatus and the cross-cutting apparatus being arranged in a common chassis, in particular the poor access to the shingling apparatus, to the cross-cutter and to the sheet transport belts is disadvantageous, which furthermore in particular makes an adjustment of the shingling apparatus in and/or counter to the transport direction of the sheets, for the purposes of adaptation to changed sheet formats or cut lengths, more difficult.

In an alternative embodiment of the invention, which may be realized in particular in conjunction with the aspects of the invention described above, the device according to the invention has a chassis in which at least the shingling apparatus is received and/or mounted, wherein the chassis is designed to be movable or displaceable laterally or transversely with respect to the transport direction of the sheets independently of the cross-cutting apparatus and, preferably, relative to a feeder of a further-processing machine. The chassis may, by means of rollers, be guided on rails. The chassis may be motor-driven. The separation of the transport plane occurs, according to the invention, in the region between the cross-cutting apparatus and the shingling apparatus.

In a preferred embodiment of the invention, the fast-running transport belts of the cross-cutting apparatus and the fast-running transport belts of the shingling apparatus engage into one another in a comb-like manner. The device permits a displacement or adjustment of the transport belts of the shingling apparatus in and counter to the transport direction of the sheets, in order that the transport belts can be moved out of the comb-like engagement in order to permit a displacement of the chassis of the shingling apparatus transversely with respect to the transport direction. After the chassis has been moved laterally out of the region of the cross-cutting apparatus, access to the shingling apparatus for maintenance and/or conversion work, in particular also for a format-dependent adjustment of the shingling apparatus in and/or counter to the transport direction of the sheets, is possible more easily and within a shorter time. Here, a paper web can remain drawn in as far as the cross-cutting apparatus, which leads to a further process simplification.

The braking apparatus may furthermore be mounted in the chassis and thus arranged so as to be movable, together with the shingling apparatus, laterally relative to a machine feeder and the cross-cutting apparatus. To the chassis, there may furthermore be fastened a transfer table which serves for the onward transport of the sheets from the braking apparatus to the further-processing machine and which, at its end, defines a transfer point for the transfer of the following sheets of the shingled sheet stream to a receiving device of the further-processing machine.

The cross-cutting apparatus is preferably designed to be immovable transversely with respect to the transport direction of the sheets and in particular transversely with respect to a paper store and furthermore in particular with respect to an unrolling apparatus for paper rolls. It is however basically also possible for the cross-cutting apparatus to also be designed to be movable laterally or transversely with respect to the transport direction of the sheets and relative to the paper store and the unrolling apparatus.

For the transfer of the sheets to a further-processing machine, it is common in the case of the roll-type cross-cutters known from the prior art for a transfer table to be provided which is pivotable relative to the transport plane of the sheets and which, after being pivoted down, is movable together with a chassis, in which the braking apparatus, the shingling apparatus and the cross-cutting apparatus are mounted, laterally with respect to a machine feeder. By means of the pivotable arrangement of the transfer table on the chassis, the maximum transfer length of the transfer table is limited by the running height of the transfer table during the lateral movement of the chassis and/or by the clear spacing of the pivot axis of the transfer table to the installation site or to the ground.

To achieve the object stated in the introduction, in an alternative embodiment of the device according to the invention, a transfer table is provided for the transfer of sheets to a sheet processing machine, wherein the transfer table is mounted so as to be non-pivotable and is height-adjustable in at least one linear or arcuate movement. The transfer table is preferably adjustable in height or movable in height obliquely with respect to the transport plane of the shingled stream. According to the invention, by contrast to the situation in the case of a pivotable fastening of the transfer table, a preferably rectilinear lowering of the transfer table obliquely with respect to the ground is possible, such that the transfer length is not restricted by the ground clearance of the transfer table, but can be greater than the ground clearance. The transfer table can furthermore be easily moved out of the region of a machine feeder. This is advantageous in particular if the transfer table is fastened to a chassis and, together with the chassis, is movable or displaceable relative to the machine feeder transversely with respect to the transport direction of the sheets. The braking apparatus and the shingling apparatus may then preferably be mounted in the chassis. After the lowering, the transfer table is then situated below the transport plane of the sheets and can be retracted into the chassis or received in the chassis. The transfer table can be retracted into the chassis such that it does not protrude beyond the braking apparatus in the transport direction in the lowered state.

In one advantageous embodiment, the braking apparatus has at least one pressure roll, also referred to as nip roll, for forming a braking gap, wherein the transfer table, during the lowering, is adjusted or moved downward relative to the nip roll, which is arranged above the transport plane of the sheets. The transfer table may be assigned a belt section which is movable together with the transfer table independently of the pressure roll. The pressure roll may be arranged in a positionally fixed manner in a movable chassis or machine module which also bears the shingling apparatus. The belt section of the transfer table may, during the oblique raising of the transfer table, be moved jointly in the direction of the pressure roll, such that a braking gap forms between the pressure roll and the belt section. Here, the braking gap preferably forms between the pressure roll and a belt start of the belt section. The braking gap can thus be easily set and adapted to different thicknesses of the sheets.

It is expedient if the transfer table is assigned a dedicated, slow belt section in order for transporting sheets from the braking apparatus to a transfer point. The slow belt section is preferably structurally decoupled from the fast belt section, wherein the fast belt section transports the sheets from the cross-cutting apparatus to the shingling apparatus and onward to the braking apparatus. The structural decoupling may in particular provide that the fast-running belts and the slow-running belts can be moved relative to one another in a horizontal direction and/or in a vertical direction and/or obliquely with respect to the ground when the transfer table is lowered or raised. Thus, the transfer table can be moved preferably obliquely with respect to the transport plane of the sheet stream and relative to the braking apparatus without impairing the transport function of the belt sections.

The inclination of the movement path of the transfer table with respect to the horizontal may amount to preferably between 30° and 60°, more preferably approximately 45°, during the oblique lowering of the transfer table.

The above-described embodiments of the invention may be combined with one another as required. The content of disclosure of the invention is not restricted to the combinations of features of the invention predefined by the selected paragraph formatting.

Further features of the present invention will emerge from the following description of an exemplary embodiment of the invention on the basis of the drawing, and from the drawing itself. Here, all of the features described and/or illustrated in the figures form the subject matter of the present invention individually or in any desired combination, irrespective of their combination in the claims or the back-references thereof.

BRIEF DESCRIPTION OF THE DRAWINGS

The invention will be discussed in more detail below on the basis of the figures, in which:

FIG. 3 is a schematic illustration of the device shown in FIG. 2 in a non-operational state with a transfer table movable obliquely with respect to the transport plane of the shingled sheet stream.

DETAILED DESCRIPTION

Figure 1:
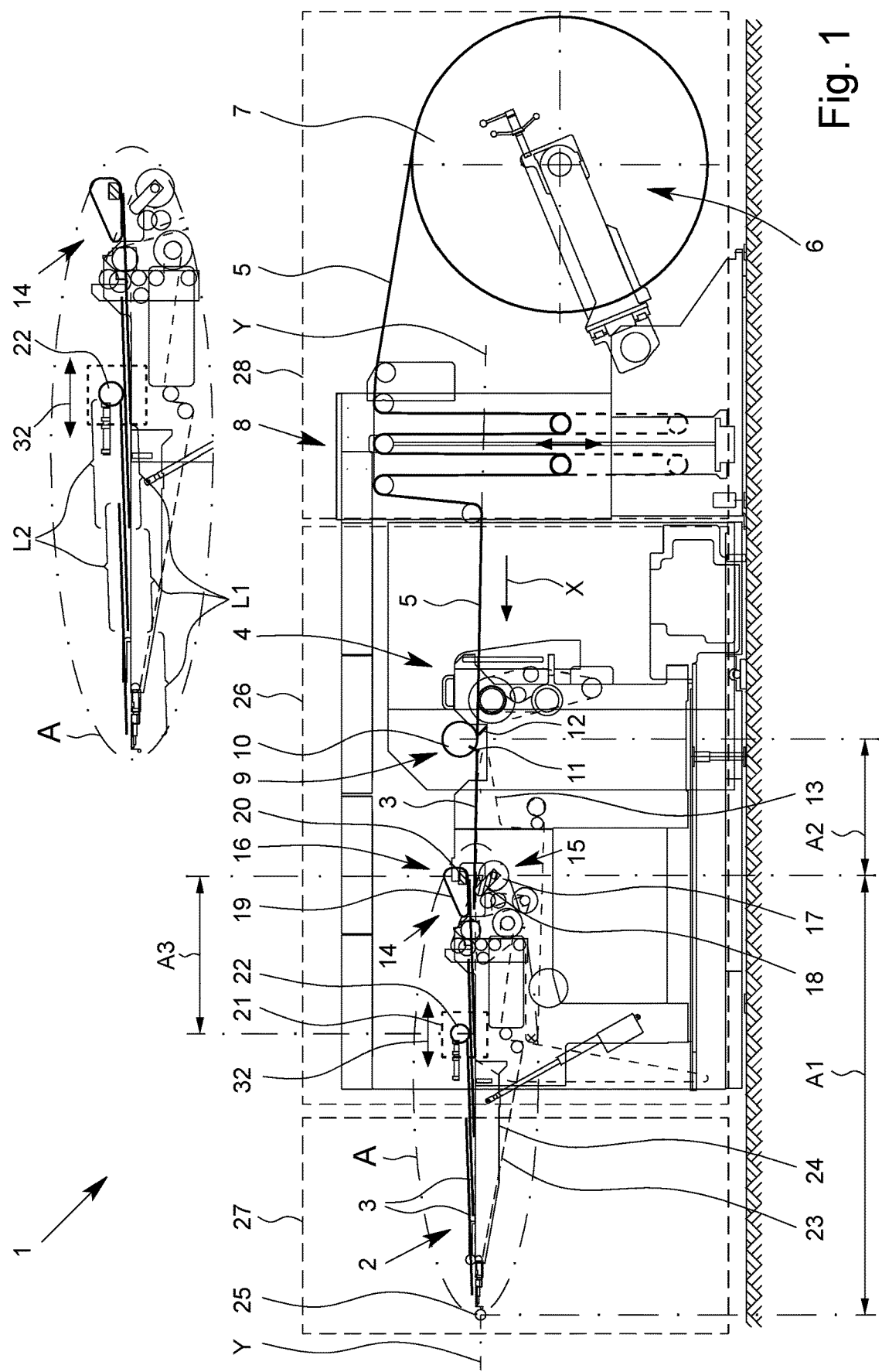
FIG. 1 is a schematic illustration of a device for forming a shingled stream of underlapping sheets according to the prior art in a side view.

FIG. 1 schematically shows a device 1 known from the prior art for forming a sheet stream 2 of underlapping sheets 3 of paper or cardboard. The device 1 has a feed apparatus 4 which conveys a virtually endless foil, paper or carboard strip 5. The strip 5 is provided from a paper or cardboard roll 7 on a feed side by means of an unrolling apparatus 6 and is guided through an interposed paper store 8. The feed to the paper store 8 takes place from above. A cross-cutting apparatus 9 positioned downstream of the feed apparatus 4 in a transport direction X of the sheets 3 cuts the strip 5 into sheets 3 of a defined length. The cross-cutting apparatus 9 is designed in the form of rotatably mounted shaft 10 which, on its circumference, has a cutting edge 11 arranged parallel to the longitudinal axis and has a fixed cutting edge 12 arranged therebelow. When the cutting edge 11 arranged on the shaft 10 and the fixed cutting edge 12 are in engagement, the strip 5 is cut. The sheet length can be adjusted through the variation of the rotational speed of the shaft 10 and/or through a variation of the speed of the material strip 5.

The sheets 3 are transported onward at the same speed in the transport direction X on a belt section with at least one fast-running transport belt 13. A shingling apparatus 14 that follows is composed of a raising unit 15 and a decelerating unit 16. The raising unit 15 has a beater shaft 17 with at least one beater 18. The decelerating unit 16 has at least one suction belt 19 arranged above the transport plane Y of the sheets 3. The suction belt 19 is formed by a transport belt which is provided with holes and which interacts with a vacuum-generating suction box 20. The beater 18 of the raising unit 15, during every rotation, presses a sheet 3, in particular in relation to the rear edge, against the suction belt 19. Since the suction belt 19 moves at a lower speed than the fast-running transport belt 13, the front edge of a trailing sheet 3 is conveyed under the raised rear edge of a leading sheet 3. With the next rotation of the beater shaft 17, the trailing sheet 3 is raised at the rear edge, such that the next trailing sheet 3 can be conveyed under the trailing sheet 3. In this way, a sheet stream 2 of underlapping sheets 3 is generated. When the rear edge of the leading sheet 3 is no longer situated in the engagement region of the suction belt 19, the leading sheet 3 is held above the sheet transport plane by the trailing sheet 3, which is situated in engagement with the suction belt 19.

A braking apparatus 21 is provided downstream of the shingling apparatus 14 in the transport direction X of the sheet stream 2. The braking apparatus 21 has a multiplicity of nip rolls 22 which, together with slow-running transport belts 23, form a braking gap. The spacing between the braking apparatus 21 and the shingling apparatus 20 is set such that the sheet front edge of a sheet 3 preferably runs into the braking gap, and is decelerated, just as the rear sheet region, in particular the rear edge of the sheet 3, is pressed by the beater 18 of the beater shaft 17 against the suction belt 19. The sheet 3 is thereby preferably braked or decelerated substantially simultaneously by the nip rolls 22 in the front sheet region and by the suction belt 19 in the rear sheet region. Downstream of the braking apparatus 21, the sheet stream 2 is transported onward at the same speed, and in particular with substantially the same shingle length L1 of the underlapping sheets 3, on a transfer table 24 to a transfer point 25.

At the transfer point 25, the sheets 3 are taken hold of by a receiving device (not shown) of a further-processing machine, such as for example a printing machine, and are transferred to the further-processing machine. For the disruption-free transfer, the sheets 3 must, with regard to the leading edge, arrive at the transfer point 25 at a particular point in time and at a particular speed, that is to say with a particular cycle frequency. The cycle frequency of the further-processing machine thus determines the cycle frequency of the sheet provision at the transfer point 25. At the same time, the further-processing machine predefines a speed with which the sheets 3 should be provided at the transfer point 25.

The spacing A1 between the transfer point 25 and the shingling apparatus 14 is independent of the format in the case of the known device. The spacing A2 between the shingling apparatus 14 and the cross-cutting apparatus 9 is likewise independent of the format. If the sheet format (the length of the sheet 3) is varied, it is necessary in the case of the known device for the spacing A3 between the braking apparatus 21 and the shingling apparatus 20 to be correspondingly adapted to the changed sheet format by virtue of the braking apparatus 21 being adjusted in or counter to the transport direction X of the sheets 3. This is shown in FIG. 1 by means of the double arrow 32. Here, the nip rolls 22 are adjusted relative to the beater shaft 17 such that, even in the event of a format change, it is still ensured that the front edge of a sheet 3 runs into the braking gap, and is decelerated, just as the rear sheet region is pressed by the beater 18 against the suction belt 19.

An adjustment of the braking apparatus 21 relative to the shingling apparatus 14 however also leads to a variation of the spacing between the braking apparatus 21 and the transfer point 25 to the further-processing machine. Since the transfer length, that is to say the spacing between the braking apparatus 21 and the transfer point 25, should be an integer multiple of the overlap length, it is therefore necessary, in the event of a format change, for the overlap length or the degree of shingling of the sheets 3 in the sheet stream 2 to be adapted in a manner dependent on the format.

The adaptation of the overlap length L2 of the sheets 3 is realized through variation of the speed differences between the fast-running 13 and slow-running transport belts 23. Owing to the changed spacing between the braking apparatus 21 and the transfer point 25, an adjustment of the phase position of the raising unit 15 of the shingling apparatus 14 and of the shaft 10, which bears the rotating cutting edge 11, of the cross-cutting apparatus 9 is necessary. The adjustment of the phase position may however have the result that, in the event of a system stoppage, the cross-cutting apparatus 9 is stopped in the cutting position. A manual removal of paper from the region of the cross-cutting apparatus 9 and/or shingling apparatus 14 that is required as a result leads to a delay in restarting the device 1.

Owing to the abovementioned conditions that must be satisfied or considered in the setup of the device 1 or in the event of a change in the sheet format, it is not possible to satisfy all of these conditions. For this reason, the device 1 is generally operated with non-ideal settings. This means that, for example, the transition length generally does not correspond to an integer multiple of the overlap length. At the same time, a sheet 3 is generally not provided at the transfer point by the slow-running transport belts 23 at the same speed as that with which the sheets are transported onward by the further-processing machine. Thus, optimum operation is generally not possible with the device known from the prior art.

FIG. 1 schematically shows that, in the case of the known device 1, the cross-cutting apparatus 9, the shingling apparatus 14 and the braking apparatus 21 are arranged in a common chassis 26, which, by means of rollers and rails, is movable laterally or transversely with respect to the transport direction X out of the region of a machine feeder 27 of the further-processing machine, and relative to the paper store 5 and the unrolling apparatus 6. The paper store 5 and the unrolling apparatus 6 are arranged in a positionally fixed machine module 28. In order to be able to move the chassis 26 out of the region of the machine feeder 27, the transfer table 24 is held or fastened pivotably on the chassis 26.

Figure 2:
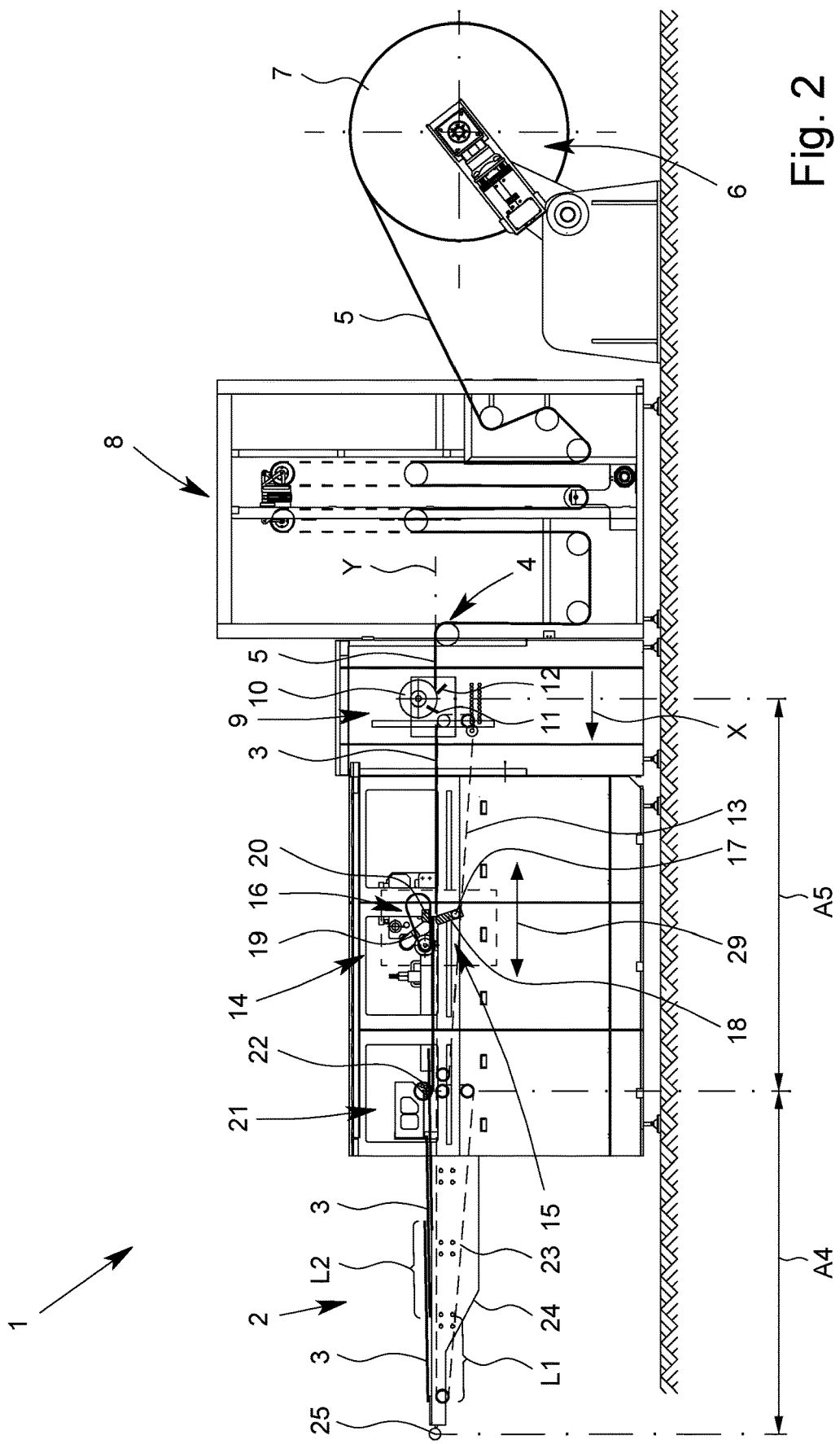
FIG. 2 is a schematic illustration of a device according to the invention for forming a shingled stream of underlapping sheets in the operational state in a side view.

FIG. 2 schematically shows another device 1 for generating a shingled stream 2 of underlapping sheets 3 in a side view. Identical or corresponding functional units, assemblies, components and other corresponding features of the devices 1 shown in FIGS. 1 and 2 are denoted by the same reference designations. The generation of a shingled stream 2 of underlapping sheets of paper or cardboard is, in the embodiment shown in FIG. 2, realized correspondingly to the above-described generation of a shingled stream in the case of the device 1 from FIG. 1.

By contrast to the device 1 shown in FIG. 1, it is provided in the embodiment as per FIG. 2 that the shingling apparatus 14 is designed to be adjustable in and/or counter to the transport direction X of the sheets in a manner dependent on a cut length. This is schematically shown in FIG. 2 by the double arrow 29. By contrast, the braking apparatus 21 is designed to be non-adjustable in and/or counter to the transport direction X of the sheets 3 in a manner dependent on a cut length. In other words, this means that, in the event of a change in the cut length of the sheets 3 or in the event of a change of the sheet format, the shingling apparatus 14 is relocated, displaced or moved relative to the braking apparatus 21 in a manner dependent on the present sheet length such that, in the case of every set sheet length, a leading sheet 3 is braked approximately simultaneously at the front by the braking apparatus 21 and at the rear by the shingling apparatus 14. Thus, the spacing A4 between the transfer point 25 of the separated sheets 3 to a further-processing machine and the braking apparatus 21, or the transfer length, remains the same for different formats or cut lengths of the sheets 3, which leads to a considerable simplification in the setting of the device 2 shown in FIG. 2 to a different sheet format.

For a format change, the shingling apparatus 14 as a whole can be adjusted in or counter to the transport direction X of the sheet stream 2, that is to say the raising unit 15 and the decelerating unit 16 are moved jointly, which units may, for this purpose, be received or mounted in a chassis or frame or carrier which is movable in and/or counter to the transport direction X of the sheets 3. It is however basically also possible that, in the case of a sufficient extent of the suction belt 19 in the transport direction X, only the beater shaft 17 with the beater 18 is adjusted in or counter to the transport direction X.

The transfer length between the braking apparatus 21 and the transfer point 25 thus remains the same in the event of a format change. Likewise, the spacing A5 between the braking apparatus 21 (or the nip rolls 22) and the cross-cutting apparatus 9 remains the same. Owing to the fact that the transfer length is always the same, the need to change the overlap length L2 of the sheets 3 in the shingled stream 2 in the event of a format change is eliminated. The speed of the slow-running transport belts 23 can thus be kept the same for every sheet format, whereby the sheets 3 can, irrespective of the format, be provided at the transfer point 25 with the same speed as that with which the sheets 3 are received and transported onward by the further-processing machine. Only the speed of the fast-running transport belts 13 has to be adapted to the new sheet format. Furthermore, only the phase position of the shaft 10 of the cross-cutting apparatus 9 has to be adapted to the new sheet format.

In the event of a stoppage of the further-processing machine, owing to the invariant overlap length, the front edges of each sheet 3 come to a standstill at the same position in each case, irrespective of the format, between the braking apparatus 21 and the transfer point 25. The position of the front edge of the first sheet 3 and the position of the front edge of the following sheet 3 are the same in the event of every stoppage of the further-processing machine, irrespective of the sheet format. This applies to all sheets that are situated between the braking apparatus 21 and the transfer point 25. In the event of a system stoppage, a sheet 3 has just entered with its front edge into the braking gap of the braking apparatus 21 and has substantially simultaneously been turned up by the beater 18 of the shingling apparatus 14 and braked at the rear edge by the suction belt 19 of the shingling apparatus 14. The following sheet 3 can be conveyed under the leading sheet 3, such that the fast-running transport belts 13 and the slow-running transport belts 23 do not need to come to a standstill simultaneously in order to maintain the phase position of the fast-running and slow-running transport belts 13, 23. The fast-running transport belts 13 can be braked more slowly, and the trailing sheet 3 lying on the fast-running transport belts 13 can run onward under the leading sheet 3 that has already been pushed up.

A stoppage of the cross-cutter apparatus 9 in the cutting position can be prevented because the spacing between the shingling apparatus 14 and the braking apparatus 21 serves as a buffer. If there is an impending risk of the cross-cutting apparatus 9 stopping in the cutting position, the cross-cutting apparatus 9 together with the fast-running transport belts 13 can for example be stopped with a slight delay, whereby the cross-cutting apparatus is no longer situated in the cutting position. As a result of the slower braking of the fast-running transport belts 13, a wear-free stoppage of the device with reduced energy consumption during the braking process is realized. This defined stopping point is configured to be the same for all sheet formats. This means that the front edges of all sheets 3 are, in the case of all sheet formats, situated in each case at the same position relative to the transfer point, between the braking apparatus 21 and the transfer point 25, in the event of a stoppage. The phase position between the fast-running transport belts 13 and the slow-running transport belts 23 can be changed upon the stoppage of the device owing to the buffer. Upon the starting of the device 1, it is then merely necessary for the slow-running transport belts 23 to be started shortly before the fast-running transport belts 13 in order to restore the synchronous, mutually coordinated phase position of the fast-running and slow-running transport belts 13, 23. A subsequent system start is thus possible easily and quickly.

For the adjustment of the shingling apparatus 14, a drive may be provided which is automatically activatable, in particular in a manner dependent on a set sheet format, in order to set the spacing between the braking apparatus 21 and the shingling apparatus 14 such that the sheets 3 are braked or decelerated preferably substantially simultaneously at the front and rear edge regions of the sheets 3.

Between the shingling apparatus 14 and the braking apparatus 21, there may be provided additional suction elements which, by means of a vacuum, draw freely hanging and sagging sheets upward in the direction of the suction belt 19 by suction. Alternatively or in addition, there may also be arranged blowing elements which push the sheets to a height in the direction of the suction belt 19.

FIG. 3 schematically shows a side view of a device 1 of the type shown in FIG. 2 prior to the commencement of operation. The same reference designations are used to denote identical functional units, assemblies and components and technical features.

In the embodiment shown in FIG. 3, the shingling apparatus 14 is received or mounted together with the braking apparatus 21 in a chassis 30 and, with the chassis 30, is mobile, in particular displaceable or movable, laterally, that is to say transversely with respect to the transport direction X of the sheets 3, out of the region of a machine feeder 27, wherein the chassis 30 may be movable by means of rollers on rails. By contrast, the cross-cutting apparatus 9, the paper store 8 and the unrolling apparatus 6 may be assigned to a positionally fixed machine module 33, such that, by lateral movement of the chassis 30 relative to the cross-cutting apparatus 9, easy access to the shingling apparatus 14, to the cross-cutting apparatus 9 and to the cutting edges 11 and 12 is also possible.

The fast-running transport belts 13 of the cross-cutting apparatus 9 and the fast-running transport belts 13 of the shingling apparatus 14 form a mutual comb-like engagement with one another, which is not illustrated in FIG. 3. The fast-running transport belts 13 of the cross-cutting apparatus 9 and/or the fast-running transport belts 13 of the shingling apparatus 14 are movable in and/or counter to the transport direction X. In this way, the comb-like engagement of the transport belts can be eliminated in order to be able to move the chassis transversely with respect to the transport direction X of the sheets 3. Furthermore, a paper web can remain drawn in as far as the cross-cutting apparatus 9, which leads to a process simplification. After the chassis 30 has been moved laterally out of the region of the cross-cutting apparatus 9, access to the various functional units for maintenance and/or conversion work, but in particular for a format-dependent adjustment of the shingling apparatus 14 in and/or counter to the transport direction X of the sheets 3, can be realized easily and in a short time.

As is schematically illustrated in FIG. 3, a transfer table 24 is provided which is movable obliquely with respect to the transport plane Y of the sheets 3 or of a generated shingled stream 2. This is shown in FIG. 3 by the two dashed lines 34. The transfer table 24 can preferably be lowered into the interior region of the chassis 30, specifically such that the transfer table 24 does not project with its front end 31 beyond the chassis 30 in the transport direction X of the sheets. In this way, the lateral movement of the chassis 30 out of the region of the machine feeder 27 is not impeded by the transfer table 24. Owing to the non-pivotable fastening of the transfer table 24 to the chassis 30, a preferably rectilinear lowering of the transfer table 24 obliquely with respect to the ground is possible, wherein the transport plane of the transfer table 24 always remains in a horizontal orientation. Alternatively, provision could also be made whereby the transfer table 24 can be initially lowered in a vertical movement and then retracted into the chassis 30 in a horizontal movement.

It is not shown in detail in FIG. 3 that a slow-running belt section is movable, together with the transfer table 24, obliquely with respect to the transport plane Y of the shingled stream 2 that is formed during the operation of the apparatus 1. By contrast, the nip rolls 22 of the braking apparatus 21 are arranged positionally fixedly on the chassis 30, such that as a result of the transfer table 24 being raised in the direction of the braking apparatus 21, a braking gap is formed between the nip rolls 22 and slow-running transport belts 23. This position of the transport belts 23 relative to the nip rolls 22 is shown in FIG. 2. Here, the braking gap forms between the nip rolls 22 and the starts of the slow-running transport belts 23.

As is also evident from FIG. 2, and not illustrated in detail in FIG. 3, the slow-running transport belts 23 that are assigned to the transfer table 24 are structurally separated from the fast-running transport belts 13 such that it is possible for the slow belt sections to be decoupled from the fast-running belt sections by lowering the transfer table 24, and to be coupled again, in order to ensure the transport of sheets, when the transfer table 24 is raised.

In the device 1 shown in FIGS. 2 and 3, the drawing-in of the web for the paper store 8 takes place from below, which leads to a simplified method implementation.

LIST OF REFERENCE DESIGNATIONS

1 Device
2 Shingled stream
3 Sheets
4 Feed apparatus
5 Belt
6 Unrolling apparatus
7 Roll
8 Paper store
9 Cross-cutting apparatus
10 Shaft
11 Cutting edge
12 Cutting edge
13 Transport belt
14 Shingling apparatus
15 Raising unit
16 Decelerating unit
17 Beater shaft
18 Beater
19 Suction belt
20 Suction box
21 Braking apparatus 22 Nip roll
23 Transport belt
24 Transfer table
25 Transfer point
26 Chassis
27 Machine feeder
28 Machine module
29 Double arrow
30 Chassis
31 Table end
32 Double arrow
33 Machine module
34 Dashed line

The invention claimed is:

1. A device for forming a shingled stream of underlapping or overlapping paper or cardboard sheets, the device having:
a transport apparatus for transporting sheets;
a shingling apparatus for underlapping or overlapping the sheets in regions;
a braking apparatus which is situated downstream of the shingling apparatus in a transport direction of the sheets and which serves for braking shingled sheets; and
a cross-cutting apparatus which is positioned upstream of the shingling apparatus and which serves for cutting a material strip into individual sheets;
wherein the shingling apparatus is mounted in a chassis which is designed to be movable relative to the cross-cutting apparatus laterally with respect to the transport direction of the sheets.

2. The device as claimed in claim 1, wherein fast-running transport belts or slow-running transport belts of the cross-cutting apparatus and fast-running transport belts of the shingling apparatus are designed to be adjustable or movable in and counter to the transport direction of the sheets.

3. The device as claimed in claim 2, wherein the cross-cutting apparatus is designed or mounted so as to be immovable transversely with respect to the transport direction of the sheets.

4. A device for forming a shingled stream of underlapping or overlapping paper or cardboard sheets, the device having:
a transport apparatus for transporting sheets;
a shingling apparatus for underlapping or overlapping the sheets in regions in order to generate a shingled stream;
a braking apparatus which is situated downstream of the shingling apparatus in a transport direction of the sheets and which serves for braking shingled sheets;
a cross-cutting apparatus which is positioned upstream of the shingling apparatus and which serves for cutting a material strip into individual sheets; and
a transfer table provided for the transfer of sheets to a sheet processing machine;
wherein the transfer table is mounted so as to be non-pivotable and is height-adjustable in at least one linear or arcuate movement obliquely to a transport plane of the shingled stream;
wherein the braking apparatus has at least one pressure roll;
wherein the transfer table has a belt section which is movable together with the transfer table independently of the at least one pressure roll; and
wherein a braking gap between the at least one pressure roll and the belt section is formed by height adjustment of the transfer table.

5. The device as claimed in claim 4, wherein:
the braking apparatus has a fast-running belt section;
the transfer table has a slow-running belt section; and
the slow-running belt section is adjustable in height or movable in height together with the transfer table independently of the fast-running belt section.

6. A method for forming a shingled stream of individual underlapping or overlapping paper or cardboard sheets cut from a material strip by means of a cross-cutting apparatus, the method comprising:
transporting separated sheets to a shingling apparatus and underlapping or overlapping the sheets in regions in order to generate a shingled stream, wherein the shingling apparatus is adjustable in or counter to a transport direction of the sheets;
braking the shingled sheets by means of a braking apparatus which is situated downstream of the shingling apparatus in the transport direction of the sheets; and
adjusting a position of the shingling apparatus in or counter to the transport direction of the sheets when a cutting length of the sheets changes;
wherein a distance between the braking apparatus and a transfer point for sheet transfer to a further-processing machine is kept constant when the cutting length of the sheets changes; and
wherein an overlap length of the sheets in the shingled stream when the cutting length of the sheets changes remains invariant for all sheet formats, and a speed of slow-running transport belts for transporting the sheets from the braking apparatus to the transfer point is kept the same for all sheet formats.

7. The method as claimed in claim 6, wherein, in the event of a system stoppage in the shingling apparatus, a buffer is provided for a trailing sheet.

8. The method as claimed in claim 6, wherein when the cutting length of the sheets changes, a speed of fast-running transport belts for transporting the sheets to the shingling apparatus and a phase position of a shaft of the cross-cutting apparatus are adapted to a new sheet format.

9. The method as claimed in claim 8, wherein in the event of a stoppage, the fast-running transport belts are braked differently than the slow-running transport belts.

10. The method as claimed in claim 9, wherein in the event of a stoppage, the fast-running transport belts are stopped in a decelerated manner in relation to the slow-running transport belts.

11. The method as claimed in claim 9, wherein in the event of a stoppage, the fast-running transport belts and the slow-running transport belts are braked such that the fast-running and slow running transport belts are no longer situated in a matching phase position; and
wherein in the event of a restart, the slow-running transport belts are started a short time before the fast-running transport belts, wherein a correct phase position is restored.

12. The method as claimed in claim 6, wherein:
the braking apparatus has one or more nip roles that together with the slow-running transport belts form a braking gap for the passage of sheets that have been brought together in the shingled form;
the braking apparatus brakes incoming sheets at a sheet front edge and ensures that the underlapping or overlapping sheets are conveyed onward at an identical and constant speed in the transport direction of the sheets;
the braking apparatus moves at higher speed than a suction belt of the shingling apparatus during operation in order that the sheets are tensioned; and the speed of the suction belt of the shingling apparatus is 95% to 99% of the speed of the braking apparatus.

\* \* \* \* \*